W. D. PUSEY.
PROCESS OF PRESERVING MILK.
APPLICATION FILED JAN. 16, 1911.
1,008,063.
Patented Nov. 7, 1911.
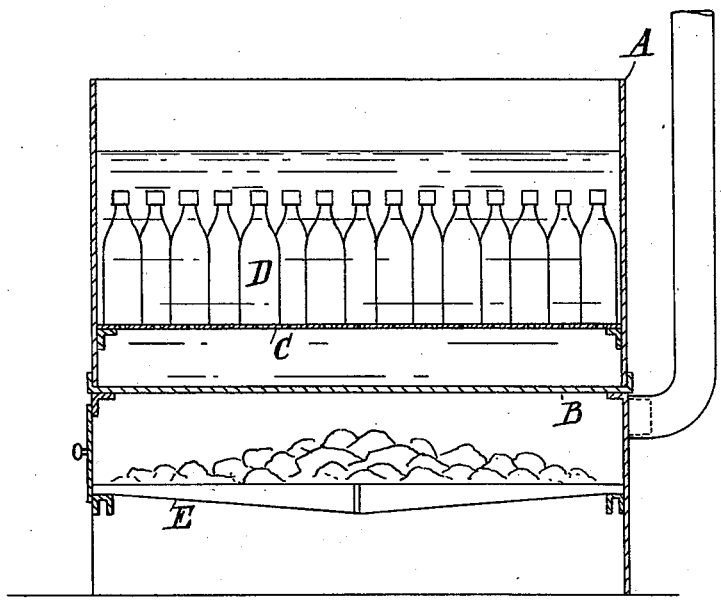
Witnesses,
Inventor,
Walter D. Pusey.
By
Atty.

UNITED STATES PATENT OFFICE.

WALTER DOBSON PUSEY, OF WOODLUPINE, NEAR PERTH, WESTERN AUSTRALIA, AUSTRALIA, ASSIGNOR OF ONE-HALF TO ARCHIBALD ROBERTSON FLEMING, OF ALBANY, WESTERN AUSTRALIA, AUSTRALIA.

PROCESS OF PRESERVING MILK.

1,008,063.      Specification of Letters Patent.      Patented Nov. 7, 1911.

Application filed January 16, 1911. Serial No. 602,941.

*To all whom it may concern:*

Be it known that I, WALTER DOBSON PUSEY, a subject of the King of Great Britain, residing at Mills Street, Woodlupine, near Perth, in the State of Western Australia, Commonwealth of Australia, architect, have invented an Improved Process for the Preservation of Milk, of which the following is a specification.

This invention has been devised with the object of providing a simple and efficient process whereby milk may be preserved for a practically indefinite period under varying conditions of temperature or climate. Accordingly the fresh warm clean milk from the animal is placed in suitable bottles, cans, or other similar receptacles previously thoroughly cleansed of all foreign matter, sterilized and allowed to dry. When almost full, sound corks thoroughly washed in clean water and then boiled in a solution of boracic acid ($H_3BO_3$) in the approximate proportion of 1 teaspoonful of boracic acid to each quart of water, are then forced (preferably while still warm) into said receptacles, and wired in position. If desired, metal or wooden disks are placed between the corks and the wires in order to prevent the latter cutting into the former. The receptacles with their contained milk are then completely immersed in open boilers, tanks, or the like containing a sufficiency of tepid water to completely cover said receptacles. Heat is then applied to the boiler, etc., and the temperature of the water raised to boiling point (212° F.). At this temperature it is retained for about 15 minutes, when the heating agent is removed and the water allowed to cool down to its original tepid state. The milk containers are then removed and hermetically sealed with wax or the like and are then ready for storage or delivery.

Milk treated by this process will keep practically indefinitely without any perceptible change taking place in its constitution and even after the containers are opened it will keep fresh for several days.

It will be obvious that no special apparatus is necessary for the carrying out of this process, but the following arrangement has been found to fulfil the necessary conditions.

Referring to the accompanying drawing, which is a longitudinal section through the tank, A designates the latter, B the bottom thereof, and C a perforated false bottom upon which the bottles D are conveniently placed side by side, while E is a fire grate, which may be made removable. It will be noted that the tank A is of sufficient depth to contain the amount of water necessary for the complete immersion of the bottles but is not so deep as to interfere with the easy manipulation of same.

Having now particularly described and ascertained the nature of my said invention and in what manner the same is to be performed, I declare that what I claim is:

The hereindescribed process for the preservation of milk, which consists in placing the milk in sterilized receptacles, closing such receptacles by sterilized corks, completely immersing the receptacles containing the milk in tepid water, increasing the temperature of such water to the boiling point and retaining it at such temperature for a period of time sufficient to sterilize the milk, allowing said water to cool to approximately normal temperature, removing the receptacles from the water, and finally hermetically sealing the receptacles.

In testimony whereof I have hereunto set my hand in presence of two subscribing witnesses.

WALTER DOBSON PUSEY.

Witnesses:
    EVERETT HENRY BARDWELL,
    WILLIAM JAMES PARSONS.

---

Copies of this patent may be obtained for five cents each, by addressing the "Commissioner of Patents, Washington, D. C."